UNITED STATES PATENT OFFICE.

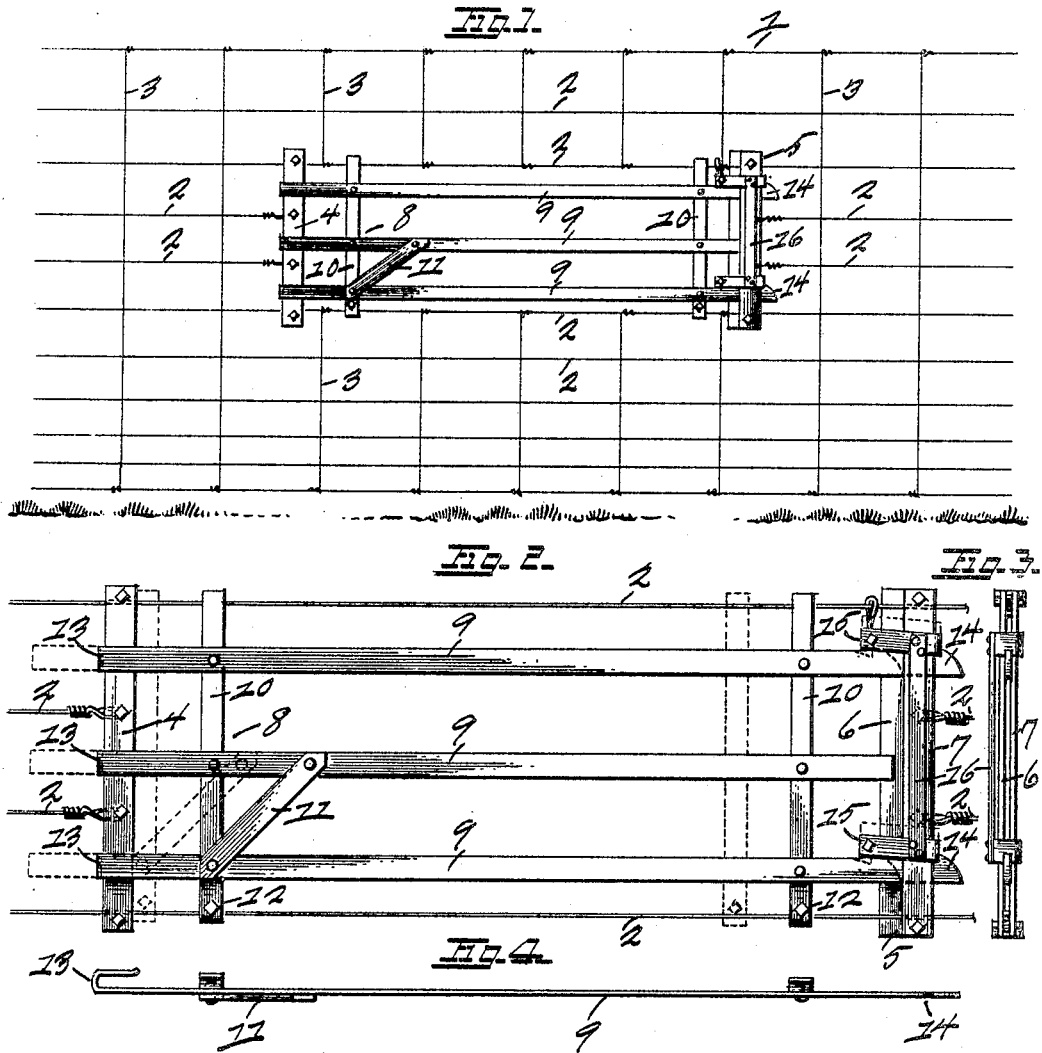

PETER MAST, OF ADRIAN, MICHIGAN, ASSIGNOR TO JOHN W. PAGE, OF ADRIAN, MICHIGAN.

FENCE-GATE.

No. 807,760.   Specification of Letters Patent.   Patented Dec. 19, 1905.

Application filed September 8, 1904. Serial No. 223,671.

*To all whom it may concern:*

Be it known that I, PETER MAST, of Adrian, county of Lenawee, and State of Michigan, have invented certain new and useful Improvements in Fence-Gates; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention has reference to an improved gate of simple and inexpensive construction adapted for use upon fences surrounding fields, stock-inclosures, confines for animals in zoölogical parks, and in other places where it may be desirable to provide ingress and egress for individuals at a minimum of expense.

The expense and labor of installing the ordinary gates used upon fences prohibit their employment in many places, since such installation necessitates additional posts, with their braces and other accessories, such as hinges, fasteners for locking the gate, &c. By the employment of my improved gate convenient ingress and egress for individuals may be provided at any point along a fence, the cost of the same being so trifling that it may be installed at frequent intervals about a field or other inclosure.

The many advantages of my invention will appear upon reference to the accompanying drawings, illustrating a preferred embodiment of the same, in which—

Figure 1 shows a section of wire fencing with a gate in position thereon constructed in accordance with my invention. Fig. 2 is an enlarged view of the gate, the dotted lines illustrating the operation of the same. Fig. 3 is an end view showing the means for locking the gate. Fig. 4 is a top edge view of the gate-section detached from the fence. Fig. 5 is a side elevation of the gate-section, showing the manner of pivoting the same upon the fence-runner.

Referring to the drawings, 1 indicates a section of wire fence having runners 2 and stays 3. In installing my gate the runners and stays are cut away to provide an interior opening of rectangular shape sufficiently large to permit the ready passage of the body therethrough, said opening being provided any suitable distance above the ground. The severed ends of the stays are secured by being twisted upon the runners at the top and bottom of the opening. On the left of the opening is provided a bar 4, preferably constructed of two like pieces bolted together, the ends of which are secured at the top and bottom to the fence-runners, the ends of the severed runners being in turn secured to said bar. On the right of the opening is also a bar 5, secured at its upper and lower ends to the runners and having the ends of the severed runners on the right secured thereto in any suitable manner. The bar 5 comprises two elongated plates 6 and 7, the former being a striking-plate for limiting the inward movement of the gate-section when closed, the latter being spaced apart from the striking-plate to permit the passage of the hooked bars of the gate-section between them.

8 indicates the gate-section constructed of flat metal bars 9, arranged horizontally, and vertically-arranged bars 10, firmly riveted together, an angular brace 11 being also provided to maintain the bars rigid with relation to each other. The lower ends of the bars 10 are bent upon themselves and provided with bolts 12, being thereby pivotally and slidably mounted upon the runner bordering the lower side of the rectangular opening in the fence-section, the upper ends of said bars being adapted to contact with the runner at the top of the opening. The horizontal bars 9 at one end are bent upon themselves, as shown at 13, forming hooks to engage the bar 4 when the gate-section is moved along the fence-runner in a right-hand direction. The upper and lower bars 9 in the illustrated embodiment of my invention are also provided with hook-shaped fastening ends 14, adapted to slide between the plates 6 and 7, being engaged when in this position by fasteners 15 in the form of metal bands connected together by a metal strap or connecting-piece 16, said bands being arranged to surround and slide in a vertical direction upon the bar 5, the downward movement of said fasteners being limited by a wire looped around the fence-runner, the ends of the loop being suitably secured to the upper fastener. It will be observed that when the gate-section is in closed and locked position, as indicated in full lines, Fig. 2, both ends of the gate-section will be firmly secured, pressure directed against the same from either side of the fence having no tendency to disengage the same.

To open the gate to effect passage therethrough, the fasteners sliding upon the bar 5 are lifted from the hooked ends 14, upon which the gate-section may be moved in left-hand direction by sliding the same upon the runner which supports it, taking the altered position in dotted lines, Fig. 2. Both ends of the gate-section are now disengaged, and the same may be lowered by swinging about the fence-runner as a hinge. The opening now provided in the fence after the gate has been lowered permits the ready passage of the body therethrough, the same being accomplished by bending the body at right angles to the legs. In closing and locking the gate the same is again raised to the position in dotted lines, Fig. 2, being then moved to the position in full lines, when the fasteners 15 will engage the hook-shaped ends 14 and securely lock the gate.

It is apparent that the gate-section may be pivoted and supported upon the runner at the top of the rectangular opening instead of the bottom one and that the same may be arranged near the ground to permit poultry and small live stock to pass therethrough, the arrangement of the gate being otherwise as herein shown, except that the hooked ends of the bars 9 should be cut or notched on the opposite side from that shown in the drawings.

From the foregoing description the novelty, utility, and many advantages of my invention should be apparent.

Although I have specifically illustrated a preferred embodiment of my invention, I do not intend to limit the scope thereof to the exact construction shown, since it is obvious that modifications and changes in detail may be made and appropriated in such a way as not to constitute a substantial departure. For instance, I have illustrated my invention as applied to a wire-fence structure, although the same is equally adapted to be employed upon any fence constructed with horizontal runners and vertical bars or rods.

Having described my invention, what I claim, and desire to secure by Letters Patent, is—

1. A fence structure having runners and stays and provided with an interior opening, bars secured to the fence structure at the sides of the opening, and a gate-section pivoted to the runner bordering said opening adapted when closed to contact with and engage said bars, substantially as described.

2. A fence structure having runners and stays and provided with an interior opening, bars at the sides of the opening secured to the runners, and a gate-section pivotally and slidably mounted upon the runner bordering said opening adapted to engage said bars, substantially as described.

3. A fence structure having runners and stays and provided with an interior opening formed by cutting out intermediate portions of the runners and stays, bars at the sides of the opening having the ends of the severed runners secured thereto the bar at one side of the opening comprising a striking-plate and a plate spaced apart therefrom, fasteners slidably mounted upon the last-named bar, and a gate-section formed of horizontal and vertical bars, the horizontal bars at one end being bent upon themselves to engage one of said bars and having the opposite ends adapted for engagement of the aforesaid fasteners, said vertical bars being at one end pivotally and slidably mounted upon the runner bordering the opening in the fence structure, substantially as described.

In testimony that I claim the foregoing as my own I affix my signature in presence of two witnesses.

PETER MAST.

Witnesses:
A. B. HEWES,
LEVI AUCHAMPAUGH.